United States Patent
Kato et al.

(10) Patent No.: US 9,762,097 B2
(45) Date of Patent: Sep. 12, 2017

(54) ROTOR AND MOTOR

(71) Applicant: ASMO CO., LTD., Shizuoka-ken (JP)

(72) Inventors: Shigemasa Kato, Toyohashi (JP); Koji Mikami, Kosai (JP)

(73) Assignee: ASMO CO., LTD., Shizuoka-ken (JP)

( * ) Notice: Subject to any disclaimer, the term of this patent is extended or adjusted under 35 U.S.C. 154(b) by 296 days.

(21) Appl. No.: 14/524,623

(22) Filed: Oct. 27, 2014

(65) Prior Publication Data

US 2015/0115760 A1 Apr. 30, 2015

(30) Foreign Application Priority Data

Oct. 31, 2013 (JP) .................................. 2013-227031
Feb. 4, 2014 (JP) .................................. 2014-019398
May 29, 2014 (JP) .................................. 2014-111508

(51) Int. Cl.
*H02K 1/27* (2006.01)

(52) U.S. Cl.
CPC .......... *H02K 1/2733* (2013.01); *H02K 1/2713* (2013.01); *H02K 2213/03* (2013.01)

(58) Field of Classification Search
CPC ...... H02K 1/22; H02K 1/2713; H02K 1/2733; H02K 21/14; H02K 21/12

USPC .......................... 310/156.21, 156.49, 156.66
See application file for complete search history.

(56) References Cited

U.S. PATENT DOCUMENTS

2013/0300242 A1   11/2013   Yamada et al.

FOREIGN PATENT DOCUMENTS

| JP | 9-327139 | 12/1997 | |
|----|----------|---------|---|
| JP | 2001230111 A | * 8/2001 | ............ H02K 1/273 |
| JP | 2006320076 A | * 11/2006 | |
| JP | 2007-215382 | 8/2007 | |
| JP | 2012-110181 | 6/2012 | |

* cited by examiner

*Primary Examiner* — Tran Nguyen
(74) *Attorney, Agent, or Firm* — Patterson Thuente Pedersen, P.A.

(57) ABSTRACT

A rotor includes a first rotor core, a second rotor core, a first magnet, a second magnet, and an annular magnet. The first magnet is arranged between first extensions of the first rotor core. The annular magnet, which is arranged between second extensions of the second rotor core, is held between the first core base and the second core base. The first magnet and the second magnet are formed integrally.

8 Claims, 13 Drawing Sheets

ROTOR AND MOTOR

RELATED APPLICATIONS

This application claims benefit of priority of Japanese Application No. 2013-227031, filed Oct. 31, 2013, and Japanese Application No. 2014-019398, filed Feb. 4, 2014, and Japanese Application No. 2014-111508, filed May 29, 2014, said applications being hereby fully incorporated herein by reference

BACKGROUND OF THE INVENTION

The present invention relates to a rotor and a motor.

In the prior art, a rotor having a consequent pole type structure is used in a motor (refer to, for example, Japanese Laid-Open Patent Publication No. 9-327139). The rotor includes a rotor core provided with integrally formed salient poles and permanent magnets, which are arranged in the rotor core in the circumferential direction. The permanent magnets function as first magnetic poles. The salient poles are located between the permanent magnets. Further, the salient poles function as second magnetic poles.

A rotor having a consequent pole type structure allows the number of permanent magnets to be reduced and is thus superior since the cost of the motor can be lowered. However, the magnetomotive force of each salient pole is smaller than the magnetomotive force of the permanent magnets. Thus, a difference is produced between the strength of the magnetic field generated by the magnetic poles of the salient poles at the teeth of a stator and the strength of the magnetic field generated by the magnetic poles of the permanent magnets at the teeth of the stator. This lowers the rotation performance of the motor.

Japanese Laid-Open Patent Publication No. 2012-110181 describes an example of a rotor including a first rotor core and a second rotor core, which are stacked upon each other in the axial direction. The first rotor core and the second rotor core each include salient poles arranged at generally equal angular intervals in the circumferential direction. The salient poles each extend in the radial direction (direction orthogonal to axial direction of rotation shaft). In each of the first and second rotor cores, permanent magnets are located between salient poles in the circumferential direction. An annular magnet magnetized in the axial direction is located between the first rotor core and the second rotor core in the axial direction. The annular magnet is held between the first rotor core and the second rotor core. First permanent magnets, which are located between the salient poles of the first rotor core, are arranged so that first magnet poles (e.g., S poles) face the stator. Thus, the salient poles of the first rotor core function as second magnetic poles (e.g., N poles). Further, second permanent magnets, which are located between the salient poles of the second rotor core, are arranged so that second magnet poles (e.g., N poles) face the stator. Thus, the salient poles of the second rotor core function as first magnetic poles (e.g., S poles). The salient poles and the second permanent magnets of the first rotor core have the same polarity as the second permanent magnets and are aligned in the axial direction. The salient poles and the second permanent magnets of the second rotor core have the same polarity as the first permanent magnets and are aligned in the axial direction. Thus, the salient poles of the first rotor core and the salient poles of the second rotor core function as different magnetic poles. As a result, the strength of the N pole magnetic field is balanced with the strength of the S pole magnetic field. This improves the rotation performance.

SUMMARY OF THE INVENTION

A rotor such as that described above includes rotor cores, permanent magnets located between salient poles of the rotor cores, and an annular magnet held between the rotor cores in the axial direction. This increases the number of components.

It is an object of the present invention to provide a rotor and a motor that limits increases in the number of components.

To achieve the above object, one aspect of the present invention is a rotor including a first rotor core, a second rotor core, a first magnet, a second magnet, and an annular magnet. The first rotor core includes a first core base and a plurality of first extensions arranged on an outer circumferential portion of the first core base. The first extensions are arranged at equal intervals in a circumferential direction and extend in a radial direction. The second rotor core includes a second core base and a plurality of second extensions arranged on an outer circumferential portion of the second core base. The second extensions are arranged at equal intervals in the circumferential direction and extend in the radial direction. Each of the second extensions is located between corresponding ones of the first extensions when viewed in an axial direction. The first magnet is arranged between the first extensions of the first rotor core and functions as a second magnetic pole. The first magnet causes the first extensions to function as first magnetic poles. The second magnet is arranged between the second extensions of the second rotor core and functions as first magnetic poles. The second magnet causes the second extensions to function as second magnetic poles. The annular magnet is held between the first core base and the second core base. The annular magnet is located toward an inner side in the radial direction from the first magnet and the second magnet, the annular magnet includes two side surfaces in the axial direction that extend orthogonal to inner surfaces of the first and second magnets and are proximate to the first core base and the second core base. The annular magnet is magnetized in the axial direction. The first magnet and the second magnet are integrally formed.

A further aspect of the present invention is a rotor including a field magnet forming at least a portion of an outer circumferential surface of the rotor. The field magnet is formed by a bonded magnet. The field magnet includes a gap.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A first embodiment of a motor will now be described.

Figure 1:
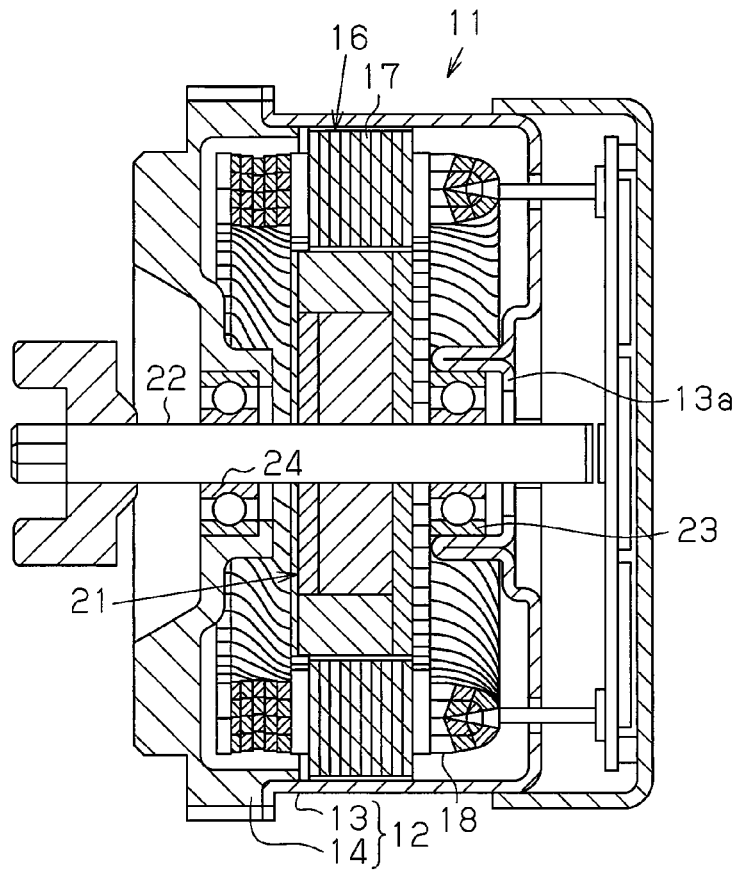
FIG. 1 is a cross-sectional view of a motor according to a first embodiment of the present invention.

As shown in FIG. 1, a brushless motor 11 includes a motor case 12. The motor case 12 includes a yoke housing 13, which is tubular and has a closed end, and an end plate 14, which closes a front (left side in FIG. 1) opening of the yoke housing 13. The yoke housing 13 is formed from, for example, magnetic iron. Further, the end plate 14 is formed from, for example, a non-magnetic resin material.

As shown in FIG. 1, a stator 16 is fixed to the inner circumferential surface of the yoke housing 13. The stator 16 includes teeth 17, which extend toward the inner side in the radial direction, and coils 18, which are wound around the teeth 17.

As shown in FIG. 1, the brushless motor 11 includes a rotor 21, which has a rotation shaft 22 and is arranged in the stator 16. The rotation shaft 22, which is a non-magnetic metal shaft, is rotationally supported by bearings 23 and 24. The bearings 23 and 24 are supported by an end wall 13a of the housing 13 and the end plate 14.

Figure 2:
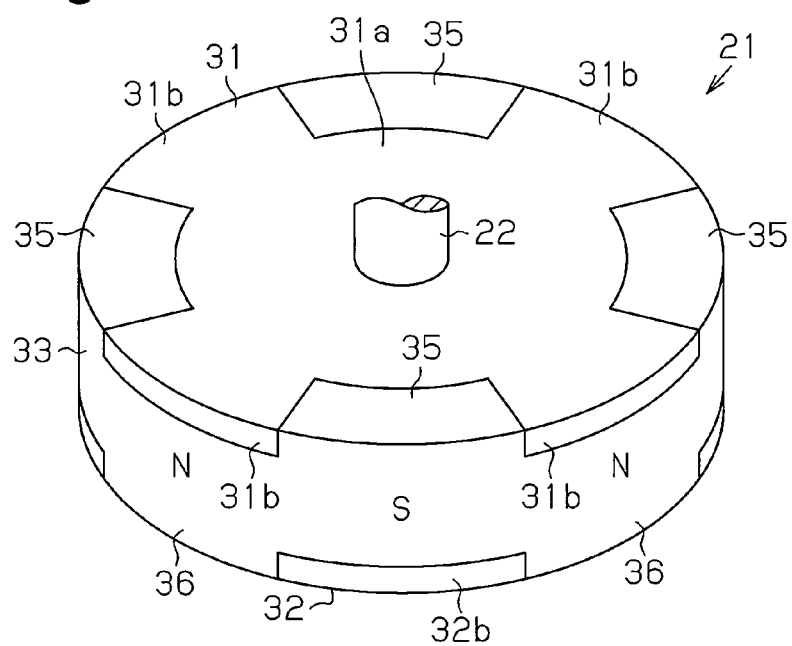
FIG. 2 is a perspective view of a rotor shown in FIG. 1.
Figure 3:
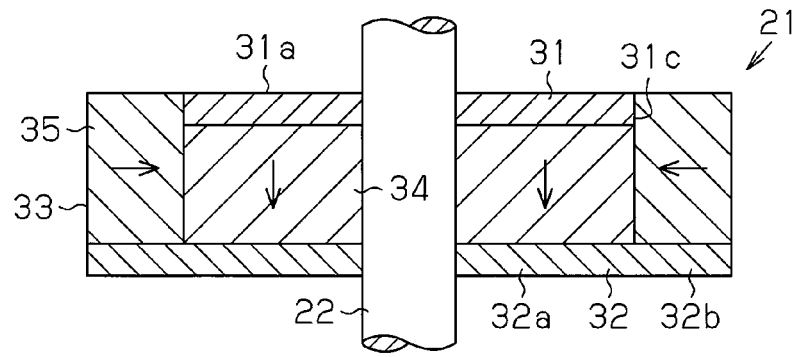
FIG. 3 is a cross-sectional view of the rotor shown in FIG. 2.
Figure 4:
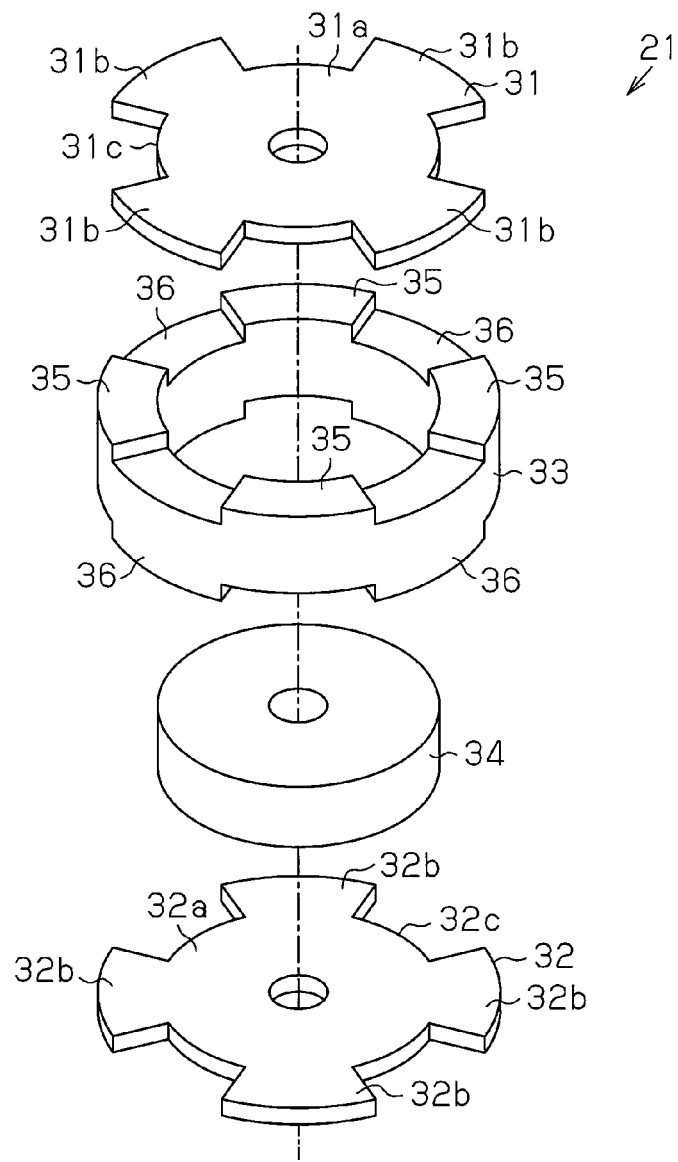
FIG. 4 is an exploded perspective view of the rotor shown in FIG. 2.

As shown in FIGS. 2 to 4, the rotor 21 includes first and second rotor cores 31 and 32, an integral magnet 33, and an annular magnet 34 located between the first and second rotor cores 31 and 32. The first and second rotor cores 31 and 32 are press-fitted to the rotation shaft 22. This fixes the first and second rotor cores 31 and 32 to the rotation shaft 22 while maintaining the distance between the first and second rotor cores 31 and 32 in the axial direction.

As shown in FIGS. 2 and 3, the first rotor core 31 includes a generally disk-shaped first core base 31a, which is punched out from a plate, and first extensions 31b, which are formed extending in only the radial direction from the first core base 31a. The first extensions 31b are sectoral when viewed in the axial direction.

As shown in FIGS. 2 and 3, the second rotor core 32 generally has the same shape as the first rotor core 31 and includes a second core base 32a, which is punched out from a plate, and second extensions 32b, which are formed extending in only the radial direction from the second core base 32a. The second extensions 32b are sectoral when viewed in the axial direction.

The rotor cores 31 and 32 each include a central hole into which the rotation shaft 22 is press-fitted. The rotor cores 31 and 32 are fixed to the rotation shaft 22 so that the distance between the outer surface of the core base 31a in the axial direction and the outer surface of the core base 32a in the axial direction, that is, the distance between opposite surfaces, is equal to a preset distance. The first extensions 31b of the first rotor core 31 and the second extensions 32b of the second rotor core 32 are alternately arranged in the circumferential direction as viewed in the axial direction. The first rotor core 31 and the second rotor core 32 hold the integral magnet 33 and the annular magnet 34, which will be described later, in between in the axial direction. The first rotor core 31 and the second rotor core 32 are pressed out of a rolled steel plate. Further, the first rotor core 31 and the second rotor core 32 are shifted from each other so that their rolling directions are generally at a right angle. The rolling direction is the direction in which the reflectance of light is the maximum. Thus, the rolling direction of the first rotor core 31 and the rolling direction of the second rotor core 32 can be determined from the difference in the reflectance of light.

Figure 5:
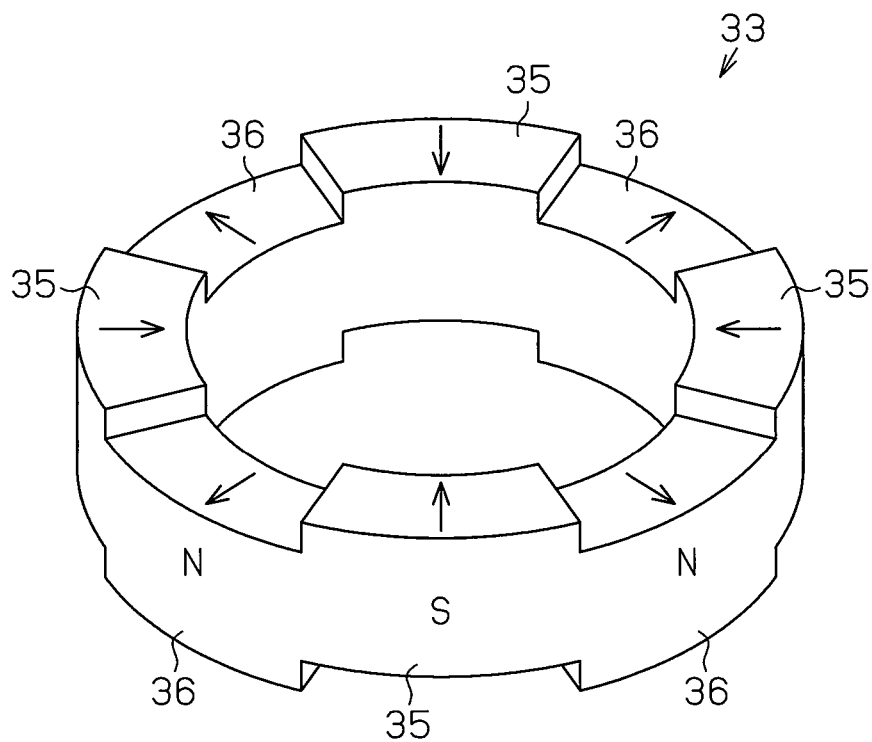
FIG. 5 is a perspective view of an integral magnet shown in FIG. 4.

As shown in FIGS. 2, 4, and 5, the integral magnet 33 includes first permanent magnets 35, which are located between the first extensions 31b of the first rotor core 31, and second permanent magnets 36, which are located between the second extensions 32b of the second rotor core 32. The integral magnet 33 is formed integrally from the first permanent magnets 35 and the second permanent magnets 36, which are alternately arranged in the circumferential direction. The integral magnet 33 is formed by a bonded magnet (plastic magnet, rubber magnet, or the like) or a sintered magnet. Further, for example, a ferrite magnet, a samarium-iron-nitride (SmFeN) magnet, a samarium cobalt (SmCo) magnet, a neodymium magnet, or an alnico magnet may be used as the integral magnet 33.

The first permanent magnets 35 are arranged between the first extensions 31b of the first rotor core 31 and contact the outer circumferential surface 31c of the core base 31a of the first rotor core 31. Further, the first permanent magnets 35 have a length that is about the same as the length obtained by adding the axial length (thickness) of the first rotor core 31 and the axial length (thickness) of the annular magnet 34. The first permanent magnets 35 have end surfaces in the axial direction that contact the second extensions 32b of the second rotor core 32 in the axial direction. Further, the first permanent magnets 35 are arranged so that magnetic poles at the outer portions in the radial direction become S poles and magnetic poles at the inner side in the radial direction become N poles. Accordingly, in the first extensions 31b of the first rotor core 31 adjacent to the first permanent magnets 35 in the circumferential direction, the magnetic poles function as N poles.

The second permanent magnets 36 are arranged between the second extensions 32b of the second rotor core 32 and contact the outer circumferential surface 32c of the core base 32a of the second rotor core 32. Further, the second permanent magnets 36 have a length that is about the same as the length obtained by adding the axial length (thickness) of the second rotor core 32 and the axial length (thickness) of the annular magnet 34. The second permanent magnets 36 have end surfaces in the axial direction that contact the first extensions 31b of the first rotor core 31 in the axial direction. Further, the second permanent magnets 36 are arranged so that magnetic poles at outer portions in the radial direction become N poles and magnetic poles at the inner side in the radial direction become S poles. Accordingly, in the second extensions 32b of the second rotor core 32 adjacent to the second permanent magnets 36 in the circumferential direction, the magnetic poles function as S poles.

Figure 6:
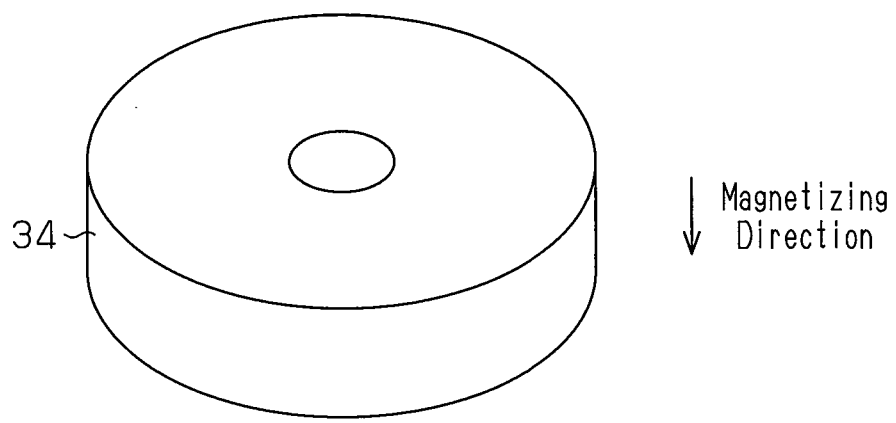
FIG. 6 is a perspective view of an annular magnet shown in FIG. 4.

As shown in FIGS. 3, 4, and 6, the annular magnet 34 is formed to be annular and includes a central hole through which the rotation shaft 22 can be inserted. The annular magnet 34 is held between the core bases 31a and 32a of the first and second rotor cores 31 and 32. The annular magnet 34 is located between the first rotor core 31 and the second rotor core 32 toward the inner side in the radial direction from the first permanent magnets 35 of the first rotor core 31 and the second permanent magnets 36 of the second rotor core 32. The annular magnet 34 has generally the same diameter as the core bases 31a and 32a. The annular magnet 34 is magnetized in the axial direction so that the portion near the first rotor core 31 is magnetized to the N pole and the portion near the second rotor core 32 is magnetized to the S pole. Further, for example, a ferrite magnet, a samarium-iron-nitride (SmFeN) magnet, a samarium cobalt (SmCo) magnet, a neodymium magnet, or an alnico magnet may be used as the annular magnet 34.

The operation of the motor in the first embodiment will now be described.

When the coils 18 are supplied with drive current, the motor 11 of the present embodiment generates a rotating magnetic field at the stator 16 and rotates the rotor 21. In this case, the first permanent magnets 35 and the second permanent magnets 36 are formed integrally. This limits increases in the number of components.

The advantages of the first embodiment will now be described.

(1) The first permanent magnets 35 and the second permanent magnets 36 are formed integrally and thus limit increases in the number of components.

(2) The magnets 33 and 34 may be formed by ferrite magnets, samarium-iron-nitride magnets, samarium cobalt magnets, neodymium magnets, or alnico magnets. Thus, the first rotor core and the second rotor core may also be formed from such versatile materials.

(3) When the magnets 33 and 34 are formed by sintered magnets or bonded magnets, the magnets 33 and 34 may be manufactured through compression molding or injection molding. Thus, the manufacturing method is not limited to a single process.

(4) The rolling direction of the first rotor core 31 is at a generally right angle to the rolling direction of the second rotor core 32. The improves the bonding strength of the rotor 21 when the first rotor core 31 and the second rotor core 32 are joined compared to when the rolling directions of the rotor cores 31 and 32 are the same.

(5) The volume of the magnets 34, 35, and 36 may be increased relative to the first and second rotor cores 31 and 32. Thus, a rotor having a large amount of magnetic flux can be obtained.

(6) The magnets 34, 35, and 36 may be held between the first and second rotor cores 31 and 32. Thus, the magnets 34, 35, and 36 may be fixed to the rotation shaft 22 while maintaining a situation in which the magnets 34, 35, and 36 are rotatable relative to the rotation shaft 22.

Second Embodiment

A second embodiment of a motor will now be described.

The motor of the present embodiment differs from the first embodiment in the structure of the rotor but is the same in the structure of the stator. Thus, the description will focus on the rotor. Same reference numerals are given to those components that are the same as the corresponding components of the first embodiment. Such components will not be described in detail.

Figure 13:
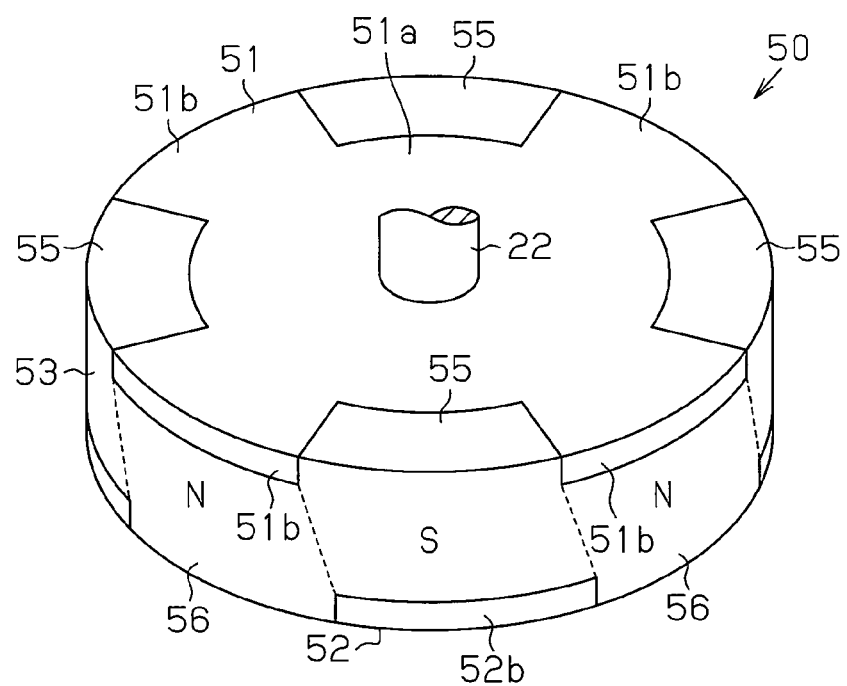
FIG. 13 is a perspective view of a rotor according to a second embodiment of the present invention.
Figure 14:
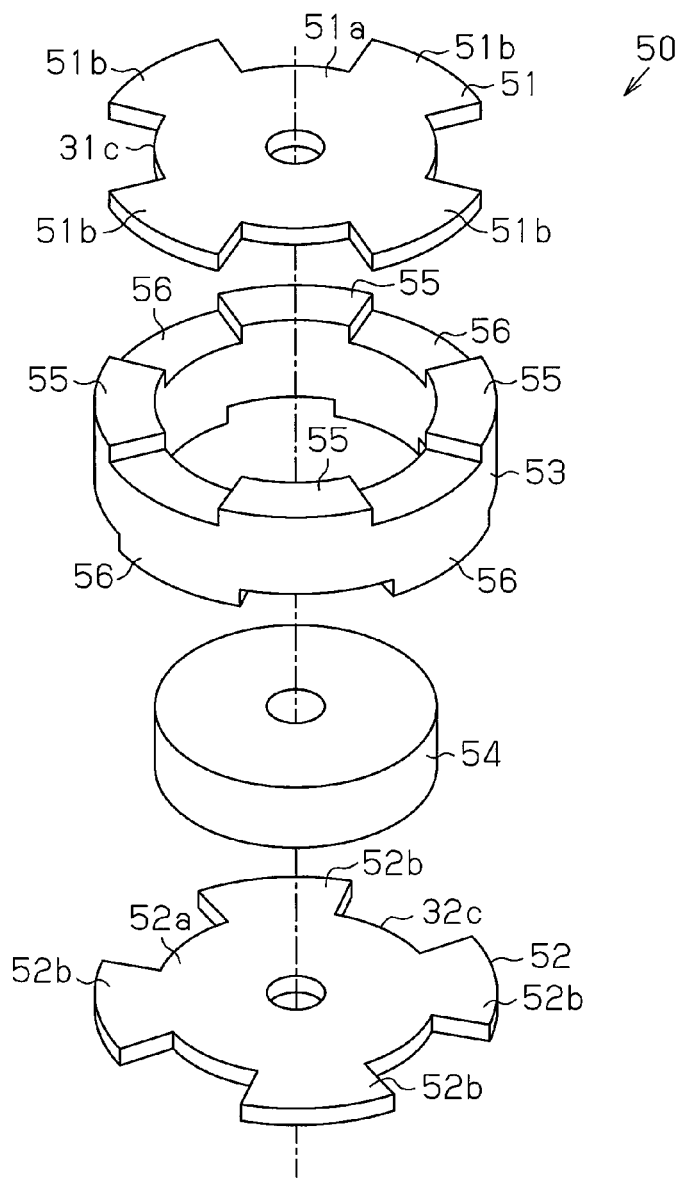
FIG. 14 is an exploded perspective view of the rotor shown in FIG. 13.

As shown in FIGS. 13 and 14, the rotor 50 of the present embodiment includes first and second rotor cores 51 and 52, an integral magnet 53, and an annular magnet 54 located between the rotor cores 51 and 52 in the axial direction. The first and second rotor cores 51 and 52 are press-fitted to the rotation shaft 22. This fixes the first and second rotor cores 51 and 52 to the rotation shaft 22 while maintaining the distance between the first and second rotor cores 51 and 52 in the axial direction.

As shown in FIG. 14, the first rotor core 51 includes a generally disk-shaped first core base 51a, which is punched out from a plate, and first extensions 51b, which are formed extending in only the radial direction from the first core base 51a. The first extensions 51b are sectoral when viewed in the axial direction.

As shown in FIG. 14, the second rotor core 52 generally has the same shape as the first rotor core 51 and includes a second core base 52a, which is punched out from a plate, and second extensions 52b, which are formed extending in only the radial direction from the second core base 52a. The second extensions 52b have generally the same shape as the first extensions 51b and are sectoral when viewed in the axial direction. The first rotor core 51 and the second rotor core 52 are pressed out of a rolled steel plate. Further, the first rotor core 51 and the second rotor core 52 are shifted from each other so that their rolling directions are generally at a right angle. The rolling direction is the direction in which the reflectance of light is the maximum. Thus, the rolling direction of the first rotor core 51 and the rolling direction of the second rotor core 52 can be determined from the difference in the reflectance of light.

The rotor cores 51 and 52 each include a central hole into which the rotation shaft 22 is press-fitted. The rotor cores 51 and 52 are fixed to the rotation shaft 22 so that the distance between the outer surface of the core base 51a in the axial direction and the outer surface of the core base 52a in the axial direction, that is, the distance between opposite surfaces, is equal to a preset distance.

Figure 16:
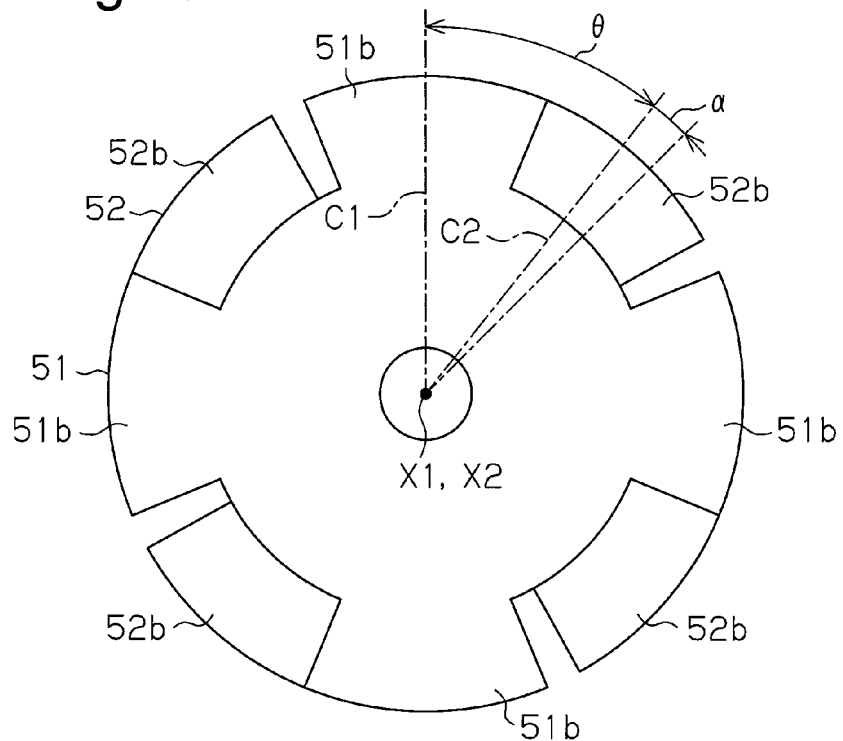
FIG. 16 is a plan view taken when first and second rotor cores shown in FIG. 13 are stacked.

As shown in FIG. 16, the first extensions 51b of the first rotor core 51 are partially overlapped with the second extensions 52b of the second rotor core 52 when viewed in the axial direction. The first rotor core 51 and the second rotor core 52 hold the integral magnet 53 and the annular magnet 54, which will be described later, in between in the axial direction. Here, C1 represents a hypothetical straight line extending through the radial center X1 of the first rotor core 51 and the circumferential center of a first extension 51b, and C2 represents a hypothetical straight line extending through the radial center X2 of the second rotor core 52 and the circumferential center of a second extension 52b. The rotor 50 is formed so that the angle θ between the hypothetical straight line C1 and the hypothetical straight line C2 satisfies the equation shown below.

$$\theta = (360/\text{pole number}) + \text{angular difference } \alpha \text{ (where } |\alpha| > 0)$$

Thus, different magnetic poles (first extensions 51b and second extensions 52b), which are arranged at generally equal intervals in the circumferential direction, are separated from one another by the angular difference α in the circumferential direction.

As shown in FIG. 14, the integral magnet 53 includes first permanent magnets 55, which are located between the first extensions 51b of the first rotor core 51, and second permanent magnets 56, which are located between the second extensions 52b of the second rotor core 52. The integral magnet 53 is formed integrally from the first permanent magnets 55 and the second permanent magnets 56, which are alternately arranged in the circumferential direction. The integral magnet 53 is formed by a bonded magnet (plastic magnet, rubber magnet, or the like) or a sintered magnet. Further, for example, a ferrite magnet, a samarium-iron-nitride (SmFeN) magnet, a samarium cobalt (SmCo) magnet, a neodymium magnet, or an alnico magnet may be used as the integral magnet 53.

Figure 15:
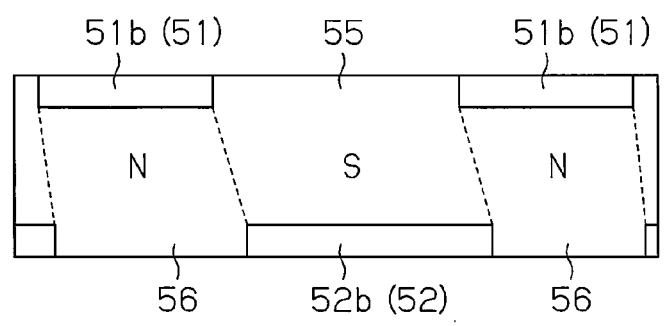
FIG. 15 is a side view of the rotor shown in FIG. 13.

As shown in FIG. 15, the first permanent magnets 55 are arranged between the first extensions 51b of the first rotor core 51 and contact the second extensions 52b of the second rotor core 52 in the axial direction. Thus, the first permanent magnets 55 are skewed. Further, the first permanent magnets 55 are arranged so that magnetic poles at outer portions in the radial direction become S poles and magnetic poles at inner portions in the radial direction become N poles. Accordingly, in the first extensions 51b of the first rotor core 51 adjacent to the first permanent magnets 55 in the circumferential direction, the magnetic poles function as N poles. Further, since the angle θ is (360/pole number)+ angular difference α, the first permanent magnets 55 are skewed in the circumferential direction by the angular difference α.

As shown in FIG. 15, the second permanent magnets 56 are arranged between the second extensions 52b of the second rotor core 52 and contact the first extensions 51b of the first rotor core 51 in the axial direction. Further, the second permanent magnets 56 are arranged so that magnetic poles at outer portions in the radial direction become N poles and magnetic poles at the inner side in the radial direction become S poles. Accordingly, in the second extensions 32b of the second rotor core 32 adjacent to the second permanent magnets 36 in the circumferential direction, the magnetic poles function as S poles. Further, since the angle θ is (360/pole number)+angular difference α, the second permanent magnets 56 are skewed in the circumferential direction by the angular difference α.

As shown in FIG. 14, the annular magnet 54 is formed to be annular and include a central hole through which the rotation shaft 22 can be inserted. The annular magnet 54 is held between the core bases 51a and 52a of the first and second rotor cores 51 and 52. The annular magnet 54 is located between the first rotor core 51 and the second rotor core 52 toward the inner side in the radial direction from the first permanent magnets 55 of the first rotor core 51 and the second permanent magnets 56 of the second rotor core 52. The annular magnet 54 has generally the same diameter as the core bases 51a and 52a. The annular magnet 54 is magnetized in the axial direction so that the portion near the first rotor core 51 is magnetized to the N pole and the portion near the second rotor core 52 is magnetized to the S pole. Further, for example, a ferrite magnet, a samarium-iron-nitride (SmFeN) magnet, a samarium cobalt (SmCo) magnet, a neodymium magnet, or an alnico magnet may be used as the annular magnet 34.

The operation of the motor in the second embodiment will now be described.

When the coils 18 are supplied with drive current, the motor 11 of the present embodiment generates a rotating magnetic field at the stator 16 and rotates the rotor 50. In this case, the first permanent magnets 55 and the second permanent magnets 56 are formed integrally. This limits increases in the number of components.

In addition to advantages (1) to (6) of first embodiment, the second embodiment has the advantages described below.

(7) Different magnetic poles, which are arranged at generally equal intervals in the circumferential direction, are separated from one another by the angular difference α in the circumferential direction. This smoothens the distribution of magnetic flux in the circumferential direction (rotation direction) and reduces cogging torque and torque pulsation (torque ripple).

(8) The first and second permanent magnets 55 and 56 are magnetized in a skewed condition, and the magnetic poles of the magnets 55 and 56 are continuous with the magnetic poles of the extensions 51b and 52b. This further smoothens the distribution of the magnetic flux and reduces cogging torque and torque pulsation (torque ripple).

The first and second embodiments may be modified as described below.

In each of the above embodiments, the first permanent magnets 35 and 55 and the second permanent magnets 36 and 56 are formed integrally to form the integral magnets 33 and 53.

Figure 7:
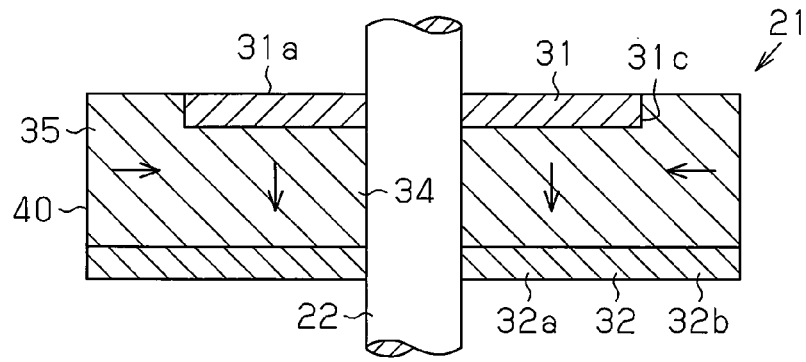
FIG. 7 is a cross-sectional view of a rotor in a further example of the first embodiment.
Figure 8:
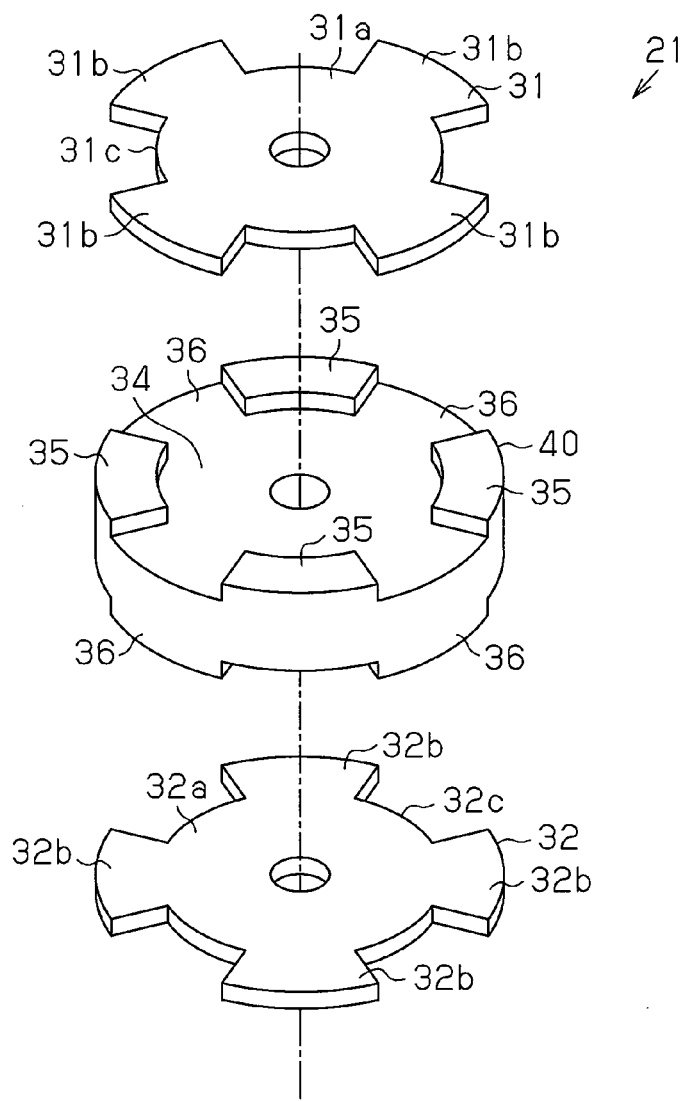
FIG. 8 is an exploded perspective view of the rotor shown in FIG. 7.

For example, as shown in FIGS. 7 and 8, the first permanent magnets 35, the second permanent magnets 36, and the annular magnet 34 may be formed integrally to obtain an integral magnet 40.

Figure 9:
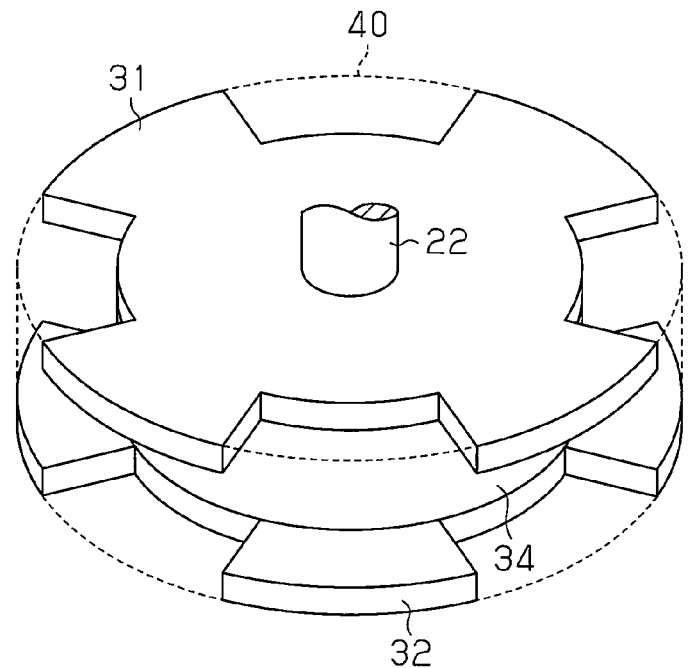
FIG. 9 is a perspective view illustrating a method for molding an integral magnet shown in FIG. 7.

In this case, for example, as shown in FIG. 9, the first and second permanent magnets 35 and 36 may be insert-molded with the annular magnet 34 held between the rotor cores 31 and 32 to form the integral magnet 40. The first and second permanent magnets 35 and 36 may be integrated with the annular magnet 34 in a post-process. By insert-molding the first and second permanent magnets 35 and 36, the first and second permanent magnets 35 and 36 may be molded and integrated with the annular magnet 34. This limits the formation of an adhesive layer or a mechanical air gap, for example, between the first and second permanent magnets 35 and 36 and the rotor cores 31 and 32. As a result, the permeance of the rotor 21 is improved, and torque can be ensured for the rotor 21.

Figure 10:
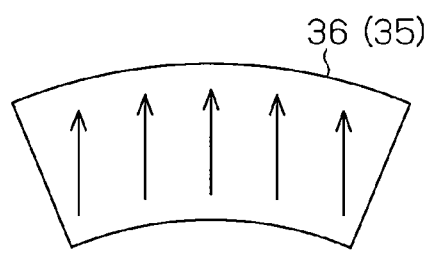
FIG. 10 is a diagram illustrating a magnetizing direction of a permanent magnet in a further example of the first embodiment.
Figure 11:
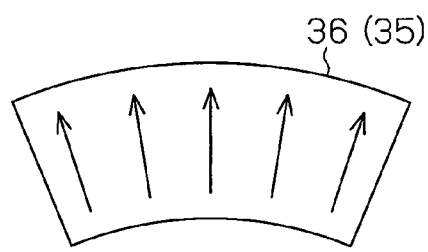
FIG. 11 is a diagram illustrating a magnetizing direction of a permanent magnet in a further example of the first embodiment.

Although not particularly mentioned in the first embodiment, the magnetizing orientation of the permanent magnets 35 and 36 may be a parallel orientation as shown in FIG. 10 or a radial orientation as shown in FIG. 11.

Figure 12:
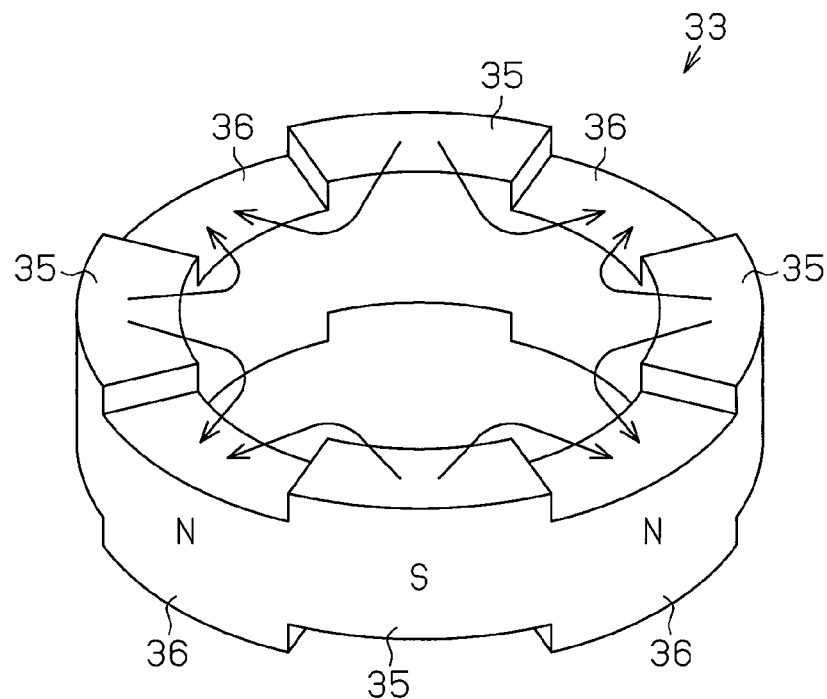
FIG. 12 is a diagram illustrating a magnetizing direction of a permanent magnet in a further example of the first embodiment.

Further, the magnetizing may be a polar anisotropic orientation like the integral magnet 33 shown in FIG. 12. In detail, the integral magnet 33 is magnetized in the polar anisotropic orientation, in which magnetic flux flows in a bulged manner curved to the inner side in the radial direction from the outer surfaces of the first permanent magnets 35, which function as the S poles, toward the outer surfaces of the second permanent magnets, which function as the N poles.

In the same manner, parallel orientation, radial orientation, or polar anisotropic orientation may be employed in the second embodiment.

Figure 17:
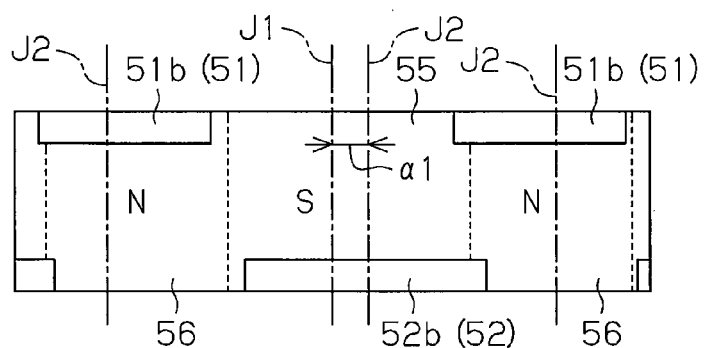
FIG. 17 is a side view of a rotor in a further example of the second embodiment.

Although not particularly mentioned in the second embodiment, as shown in FIG. 17, the magnetic pole centers J1 of the first permanent magnets 55 and the second permanent magnets 56 may be separated from the circumferential centers J2 of the extensions 51b and 52b in the circumferential direction by angle α1. This smoothens the distribution of magnetic flux in the circumferential direction (rotation direction) and reduces cogging torque and torque pulsation (torque ripple).

Figure 18:
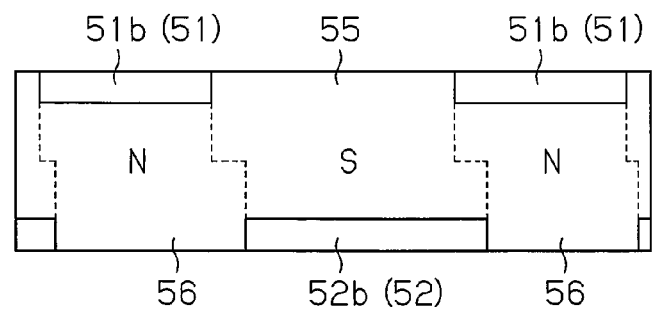
FIG. 18 is a side view of a rotor in a further example of the second embodiment.

Further, as shown by the broken lines in FIG. 18, the first permanent magnets 55 and the second permanent magnets 55 may be formed so that the magnetic poles of the first permanent magnets 55 and the magnetic poles of the second permanent magnets 56 switch in the axial direction and the circumferential direction. In other words, the first permanent magnets 55 and the second permanent magnets 55 may be formed so that the magnetic poles of the first permanent magnets 55 and the magnetic poles of the second permanent magnets 56 are stepped.

In the above embodiments, the number of poles in the rotor is eight. However, the number of poles in the rotor may be changed.

Each of the above embodiments and modified examples may be combined.

Third Embodiment

A third embodiment of a motor will now be described.

Figure 19:
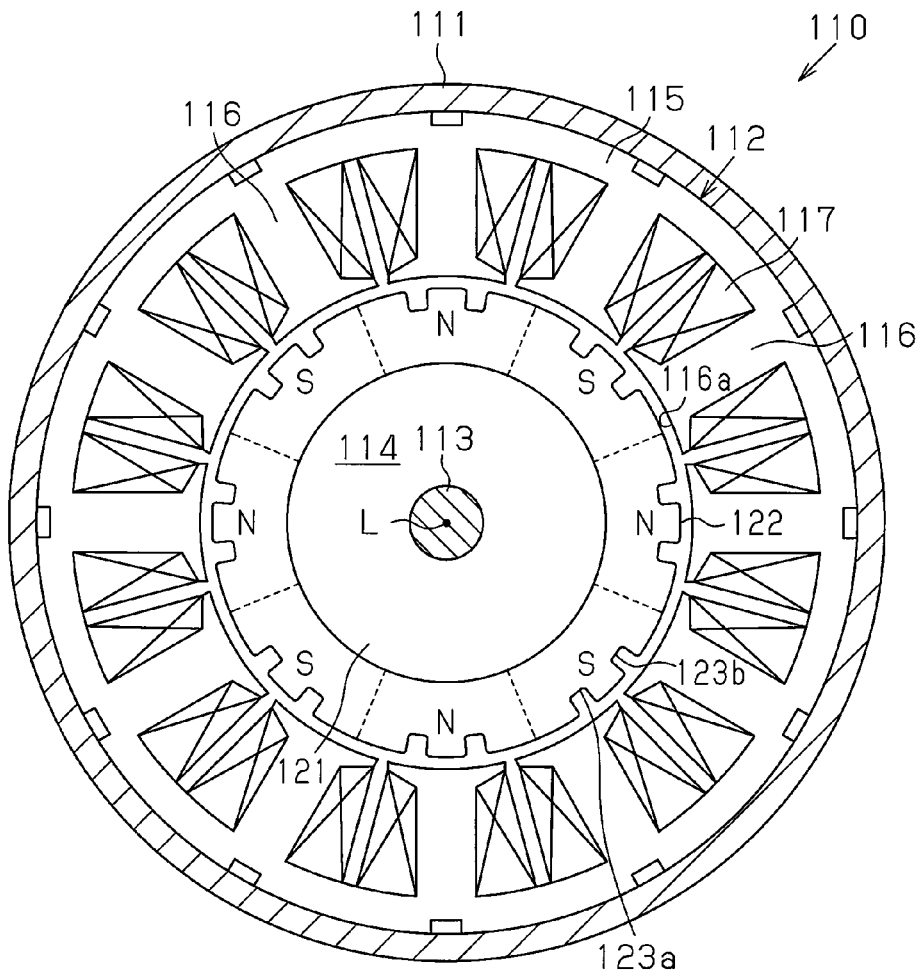
FIG. 19 is a cross-sectional view of a brushless motor in a third embodiment.

FIG. 19 shows a brushless motor 110. A stator 112 is fixed to an inner circumferential surface of a motor housing 111. A rotor 114, which is fixed to a rotation shaft 113 and rotated integrally with the rotation shaft 113, is arranged at the inner side of the stator 112.

The stator 112 includes a tubular stator core 115, and the outer circumferential surface of the stator core 115 is fixed to the motor housing 111. A plurality of (twelve in the present embodiment) teeth 116 are arranged in the circumferential direction at the inner side of the stator core 115. Each tooth 116 extends in the axial direction and toward the inner side in the radial direction from the stator core 115. Each tooth 116 is a T-type tooth. An inner circumferential surface 116a of the tooth 116 in the radial direction is an arcuate surface. The arcuate surface coincides with a line obtained by extending an arc of a circle, the center of which is the axis L of the rotation shaft 113, in the axial direction.

Three-phase coils 117 are wound around the teeth 116 in a concentrated winding. Three-phase power voltage is applied to the three-phase coils 117 to form a rotating magnetic field at the stator 112 and rotate the rotor 114, which is fixed to the rotation shaft 113 located at the inner side of the stator 112.

Structure of Rotor

The rotor 114 arranged at the inner side of the stator 112 includes a generally tubular rotor core 121, which is fixed to the rotation shaft 113 to be rotatable integrally with the rotation shaft 113, and a tubular field magnet 122, which is arranged on the outer circumferential surface of the rotor core 121. In other words, the outer circumferential surface of the rotor 114 is entirely formed by the field magnet 122 in the circumferential direction. The rotor core 121 is formed by stacking electromagnetic steel plates in the axial direction.

The field magnet 122 is formed by a bonded magnet obtained by molding and hardening a mixture of a magnetic powder and a resin. The field magnet 122 is formed integrally with the outer circumferential surface of the rotor core 121 through, for example, injection molding. The field magnet 122 may be fixed by an adhesive or the like to the outer circumferential surface of the rotor core 121. A bonded magnet allows for a higher degree of freedom in shape than a sintered magnet and can be formed with a high dimensional accuracy.

The field magnet 122 is a magnet having eight poles, four N poles and four S poles alternately arranged in the circumferential direction. The eight magnetic poles each have the same angular width (i.e., 45°). The rotor 114 is a full-magnet type rotor in which the magnetic poles are all formed by the field magnet 122. The orientation direction of each magnetic pole in the field magnet 122 extends in the radial direction from the rotation shaft 113.

The outer circumferential surface of the field magnet 122 is generally circular and extends around the axis L of the rotation shaft 113. The field magnet 122 includes two grooves, a first auxiliary groove 123a and a second auxiliary groove 123b formed in the outer circumferential surface of each magnetic pole. The first and second auxiliary grooves 123a and 123b extend straight from one end to the other end in the axial direction of the field magnet 122. The first and second auxiliary grooves 123a and 123b have U-shaped cross-sections in a direction orthogonal to the axis.

The positions where the first and second auxiliary grooves 123a and 123b are formed will now be described.

Figure 20:
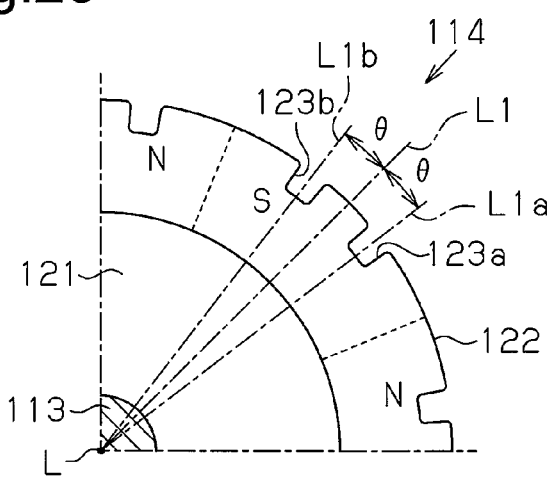
FIG. 20 is a partial plan view of a rotor shown in FIG. 19.

Referring to FIG. 20, a first straight line L1a and a second straight line L1b are straight lines separated in the clockwise direction and the counterclockwise direction by angle θ from a circumferential center line L1 of each magnetic pole in the field magnet 122.

The angle θ is obtained based on the cogging torque cycle (angle φ) using the following equation.

$$\theta = (1/2 + n) \cdot \phi$$

Here, n is an integer. In the present embodiment, n=0 is satisfied.

The cogging torque cycle φ is generally obtained by dividing 360° by the least common multiple of the number of poles in the rotor 114 (field magnet 122) and the number of teeth 116 (number of slots) of the stator 112. More specifically, in the present embodiment, the number of poles of in the rotor 114 is eight and the number of teeth 116 is twelve. Thus, the least common multiple is twenty-four. Further, the cogging torque cycle φ is 15 (360/24) degrees. Accordingly, the angle θ is 7.5 (15/2) degrees.

The outer circumferential surface of each magnetic pole in the field magnet 122 includes grooves, the center position in the circumferential direction of which is the first straight line L1a or the second straight line L1b. Each groove has a constant width.

The groove of which the circumferential center position is the first straight line L1a is referred to as the first auxiliary groove 123a, and the groove of which the circumferential center position is the second straight line L1b is referred to as the second auxiliary groove 123b. Accordingly, the angle about the axis L of the rotation shaft 113 between the circumferential center of the first auxiliary groove 123a and the circumferential center of the second auxiliary groove 123b coincides with the cogging torque cycle ϕ(15°).

The angles of the first and second straight lines L1a and L1b from the circumferential center line L1 are both one half (7.5°) of the cogging torque cycle ϕ. Further, the first auxiliary groove 123a and the second auxiliary groove 123b are formed at symmetric positions using the circumferential center line L1 as a symmetric axis.

The operation of the third embodiment will now be described.

When three-phase power voltage is applied to the coils 117 of the stator 112 and a rotating magnetic field is formed, the rotating magnetic field rotates the rotor 114. When the supply of power to the coils 117 is stopped, the rotating magnetic field is lost thereby stopping the rotation of the rotor 114. In this case, the rotor 114 stops at an angular position where the rotor 114 is in the most magnetically stable condition relative to the stator 112.

Here, the outer circumferential surface of the field magnet 122 in the rotor 114 includes the first and second auxiliary grooves 123a and 123b. Thus, magnetic flux changes in the circumferential direction at the outer circumference of the rotor 114 is greater than before the formation of the first and second auxiliary grooves 123a and 123b. This increases the holding force (detent torque) that acts to return the magnetic flux to a stable condition.

In the present embodiment, the first auxiliary groove 123a and the second auxiliary groove 123b are formed at line symmetric positions relative to the circumferential center axis L1. The angle between the circumferential center of the first auxiliary groove 123a and the circumferential center of the second auxiliary groove 123b coincides with the cogging torque cycle ϕ (15°).

Figure 21:
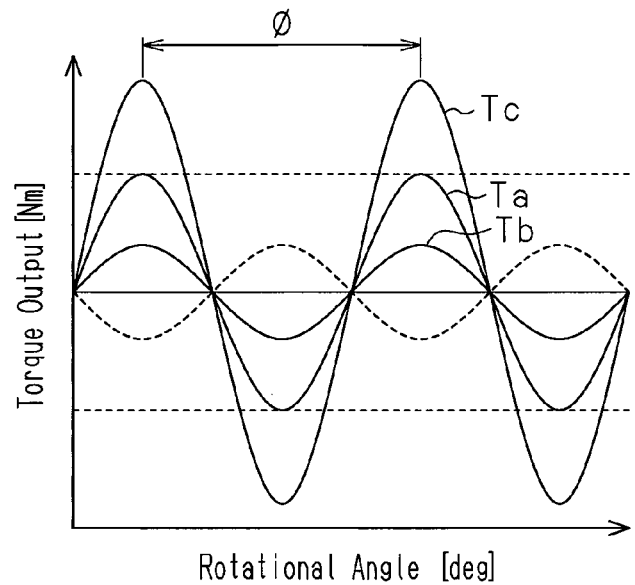
FIG. 21 is a graph illustrating the detent torque in the motor of FIG. 19.

Thus, as shown in FIG. 21, the groove pre-formation detent torque Ta, which is obtained before formation of the first and second auxiliary grooves 123a and 123b (i.e., detent torque when first and second auxiliary grooves 123a and 123b do not exist), has the same phase as the auxiliary groove detent torque Tb. This superimposes the groove pre-formation detent torque Ta on the auxiliary groove detent torque Tb and maximizes the total detent torque Tc.

The third embodiment has the advantages described below.

(9) The rotor 114 is of an SPM type in which the field magnet 122 is arranged on the outer circumferential surface of the rotor core 121. This reduces torque ripple. Further, outer circumferential surface of the field magnet 122 includes the first and second auxiliary grooves 123a and 123b, which serve as gaps. This improves the detent torque. Further, a bonded magnet, which has a higher degree of freedom in shape than a sintered magnet, is employed. This facilitates the formation of the gaps (first and second auxiliary grooves 123a and 123b). In this manner, the brushless motor 110 of the present embodiment facilitates manufacturing while reducing the torque ripple and improving the detent torque.

(10) The gaps that improve the detent torque are the first and second auxiliary grooves 123a and 123b formed in the outer circumferential surface of the field magnet 122 extending in the axial direction. Thus, the gaps can be easily formed.

(11) The angles of the first and second straight lines L1a and L1b from the circumferential center line L1 of the magnetic poles of the field magnet 122 are both one half of the cogging torque cycle ϕ. Thus, the largest total detent torque Tc can be generated.

The third embodiment may be modified as described below.

In the third embodiment, the magnetic poles of the rotor 114 are formed in the tubular field magnet 122. Instead, the field magnet 122 may be separated into magnetic poles.

In the third embodiment, the rotor 114 is of a full-magnet type rotor. Instead, the rotor 114 may be of, for example, a half-magnet type (consequent pole type).

Figure 22:
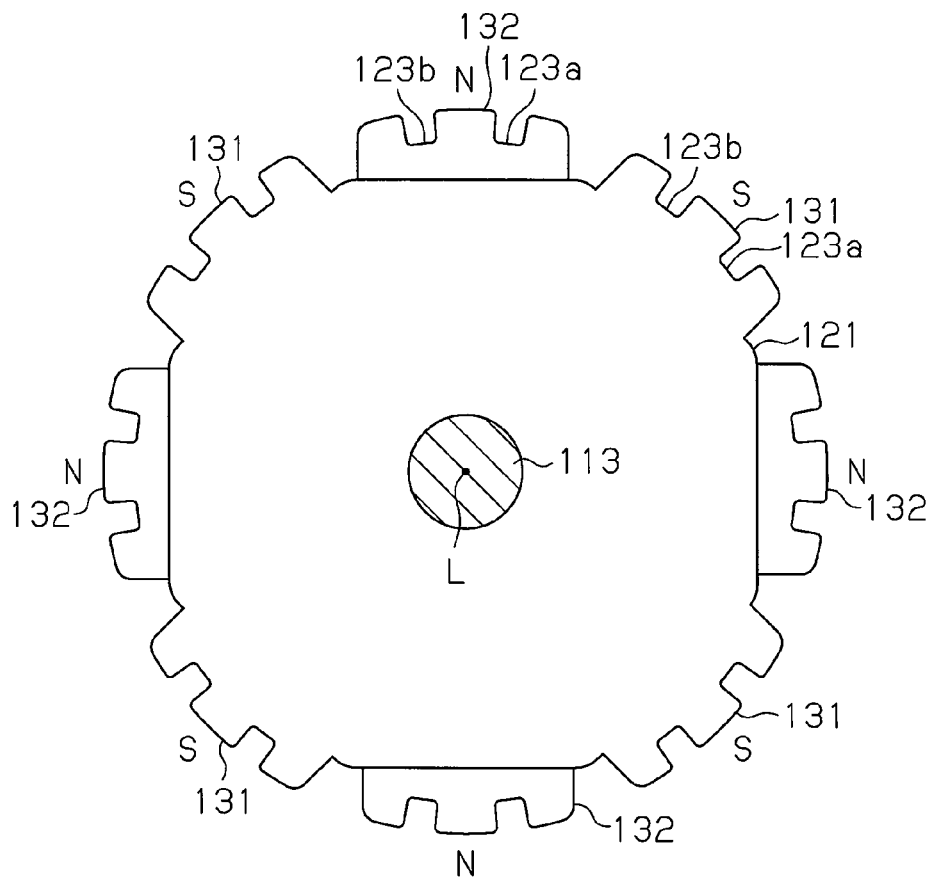
FIG. 22 is a plan view of a rotor in a further example of the third embodiment.

As shown in FIG. 22, the outer circumferential surface of a rotor core 121 includes four core magnetic poles 131 (pseudo-magnetic poles) that are formed integrally. The four core magnetic poles 131 are arranged at equal angular intervals (90-degree intervals) in the circumferential direction and project toward the outer side in the radial direction. Each core magnetic pole 131 extends throughout the rotor core 121 in the axial direction.

Four field magnets 132, which are formed by bonded magnets, are fixed at equal intervals in the circumferential direction (90-degree intervals) to the outer circumferential surface of the rotor core 121. Each field magnet 132 is located between the corresponding core magnetic poles 131. The field magnets 132 and the core magnetic poles 131 are alternately arranged at equal intervals (45-degree intervals) in the circumferential direction.

The four field magnets 132 each have a magnetizing orientation extending in the radial direction and are set to have the same magnetic pole (N pole in FIG. 22). The field magnet 132 causes the core magnetic poles 131 to function as magnetic poles (S poles in FIG. 22) that are opposite to the magnetic poles of the field magnets 132.

The outer circumferential surfaces of the core magnetic poles 131 and the outer circumferential surfaces of the field magnet 132 extend along a circle of which the center is the axis L as viewed in the axial direction and form the outer circumferential surface of the rotor 114. Further, the outer circumferential surface of each core magnetic pole 131 and the outer circumferential surface of each field magnet 132 include first and second auxiliary grooves 123a and 123b similar to those of the third embodiment.

Such a structure has the same advantages as the third embodiment. That is, in an SPM type half-magnet rotor (consequent pole type rotor), manufacturing can be facilitated while reducing the torque ripple and improving the detent torque.

In the above example, the first and second auxiliary grooves 123a and 123b are formed not only in the outer circumferential surfaces of the field magnet 132 but also in the outer circumferential surfaces of the core magnetic poles 131. However, the first and second auxiliary grooves 123a and 123b may be omitted from the core magnetic poles 131.

In the above embodiment, the structures of rotor core 121 of the rotor 114 and the field magnet 122 may be modified as shown in FIGS. 23 to 26.

In a rotor shown in FIGS. 23 to 26, the rotor core 140 includes a first core member 141 and a second core member 151, which are identical in shape.

Figure 25:
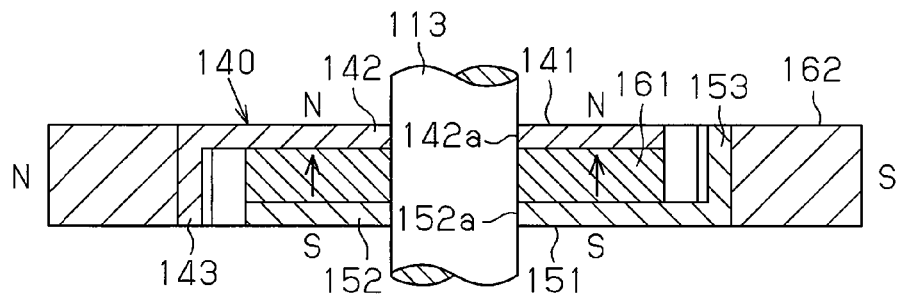
FIG. 25 is a joined cross-sectional view taken along line A-A in FIG. 24.
Figure 26:
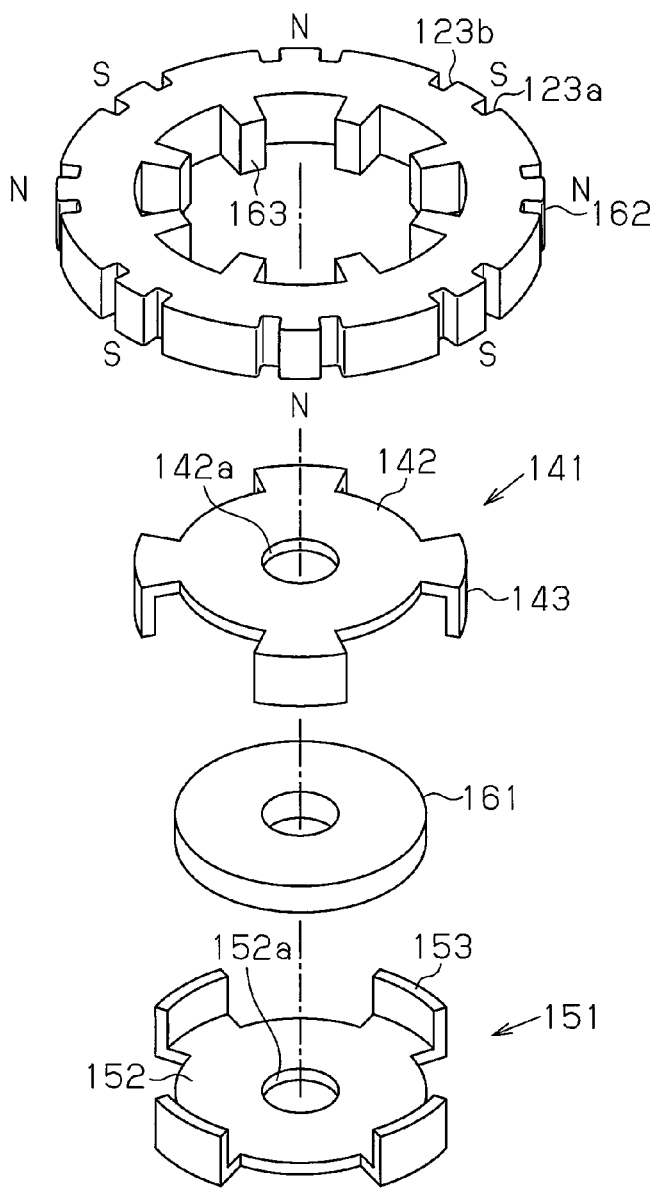
FIG. 26 is an exploded perspective view of the rotor shown in FIG. 23.

As shown in FIGS. 25 and 26, the first core member 141 includes a generally disk-shaped first core base 142 having a fastening hole 142a through which the rotation shaft 113 is inserted and fixed. The outer circumferential portion of the first core base 142 includes a plurality of (four) first claws 143 arranged at equal intervals. The first claws 143 project toward the outer side in the radial direction and extend in the axial direction.

The second core member 151, which is identical in shape with the first core member 141, includes a second core base 152 (fastening hole 152a) and second claws 153 respectively corresponding to the first core base 142 (fastening hole 142a) and the first claws 143 of the first core member 141. The second core member 151 is coupled to the first core member 141 so that the second claws 153 are located between the corresponding first claws 143.

A disk magnet 161 is located between the first core base 142 and the second core base 152 in the axial direction. The disk magnet 161 is annular, and the rotation shaft 113 extends through the central portion of the disk magnet 161. The axial end surfaces of the disk magnet 161 are planar, orthogonal to the axis L of the rotation shaft 113, and contact the inner end surfaces of the first and second core bases 142 and 152.

The first claws 143 are spaced apart from the outer circumferential surface of the second core base 152 and the outer circumferential surface of the disk magnet 161. Further, the axial distal end surfaces of the first claws 143 are flush with the outer end surface of the second core base 152.

In the same manner, the second claws 153 are spaced apart from the outer circumferential surface of the first core base 142 and the outer circumferential surface of the disk magnet 161. Further, the axial distal end surfaces of the second claws 153 are flush with the outer end surface of the first core base 142.

The disk magnet 161 is magnetized in the axial direction to cause the first claws 143 to function as first magnetic poles (N poles in the present embodiment) and the second claws 153 to function as second magnetic poles (S poles in the present embodiment).

Figure 23:
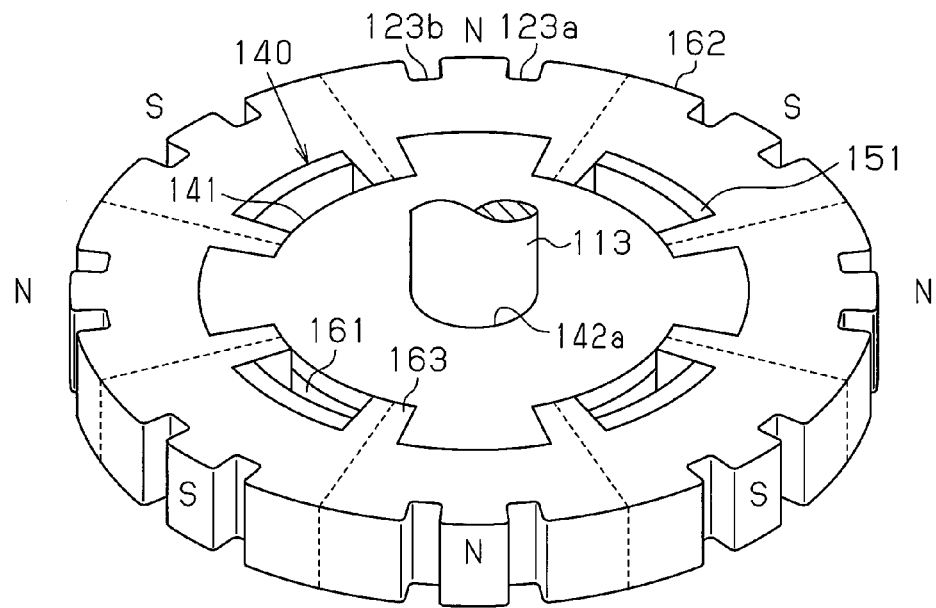
FIG. 23 is a perspective view of a rotor in a further example of the third embodiment.
Figure 24:
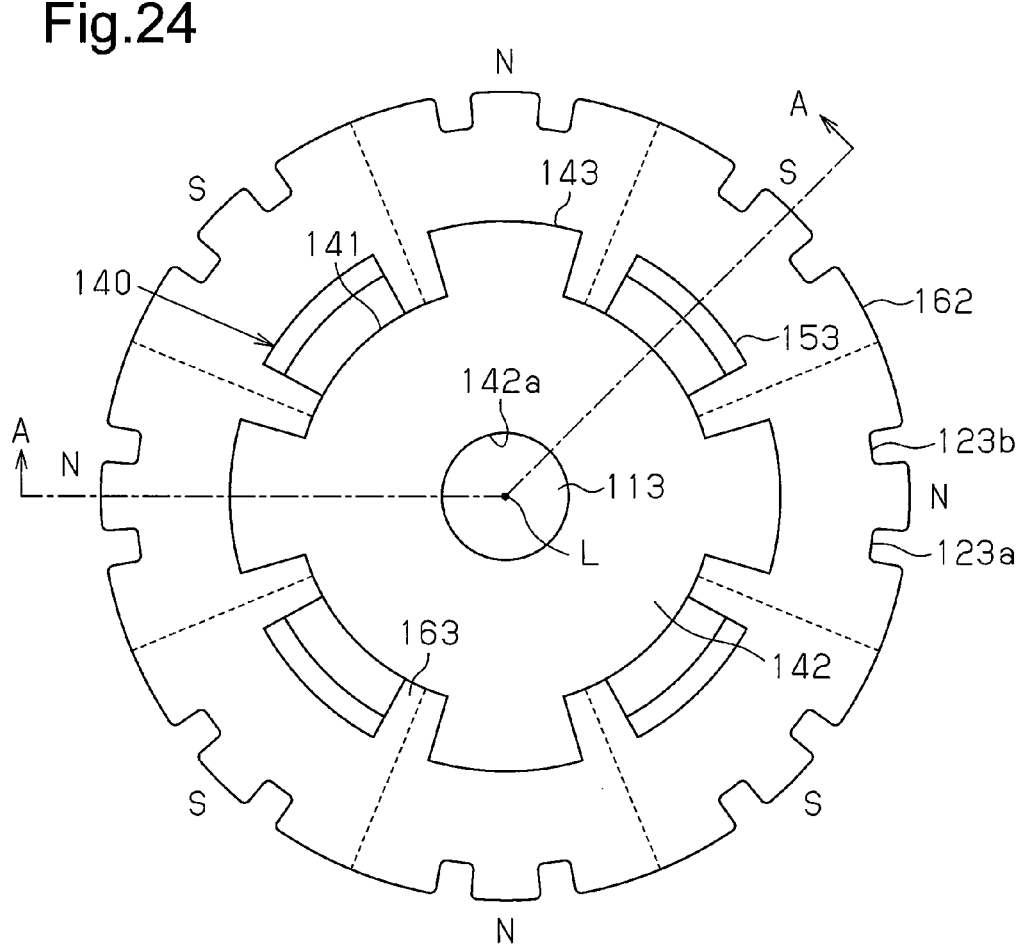
FIG. 24 is a plan view of the rotor shown in FIG. 23.

As shown in FIGS. 23 and 24, a field magnet 162, which is generally tubular, is arranged at the outer side of the first and second core members 141 and 151 in the radial direction. Preferably, the field magnet 162 is arranged on the outer circumferential surfaces of the first and second core members 141 and 151. The field magnet 162 is formed by a bonded magnet that is similar to the field magnet 122 of the above embodiment. The magnetic pole structure and the outer circumferential shape (first and second auxiliary grooves 123a and 123b) of the field magnet 162 are similar to the field magnet 122 of the third embodiment.

The inner circumferential surface of the field magnet 162 includes eight projections 163 projecting toward the inner side in the radial direction. The projections 163 are located between the first claws 143 and the second claws 153 in the circumferential direction and contact the first claws 143 and the second claws 153 in the circumferential direction. This prevents idle rotation of the field magnet 162.

In addition to the advantages of the third embodiment, the added disk magnet 161 improves the output. The above structure arranges the field magnet 162 on the outer circumference of a Lundell type structure rotor using the first core member 141, the second core member 151, and the disk magnet 161.

In the above example, the void at the inner side of the first and second claws 143 and 153 in the radial direction may be filled by a portion formed integrally with the field magnet 162 (projections 163). The projections 163 may be omitted from the above example.

Figure 27:
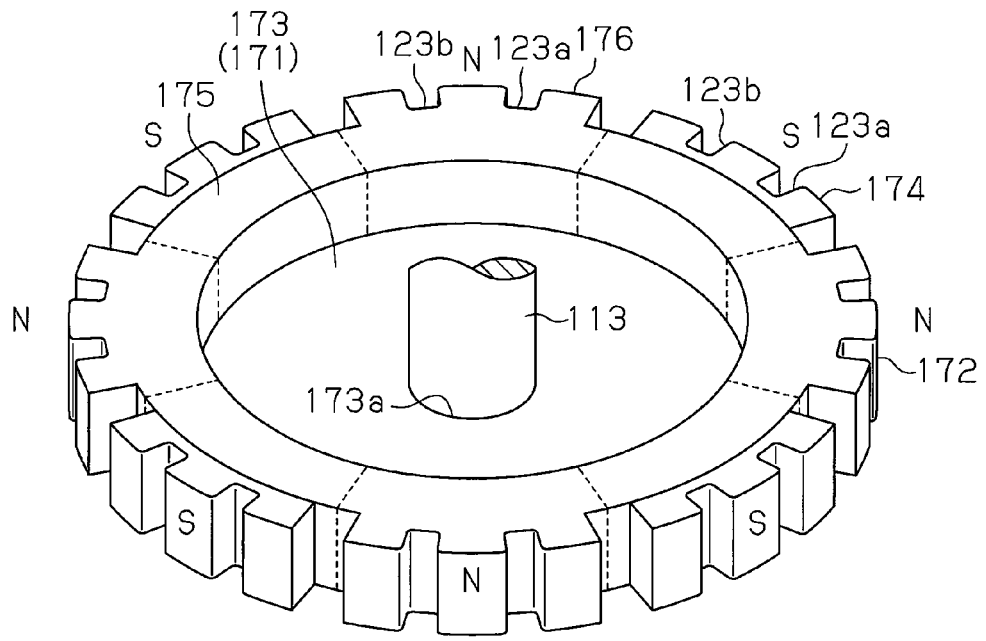
FIG. 27 is a perspective view of a rotor in a further example of the third embodiment.
Figure 28:
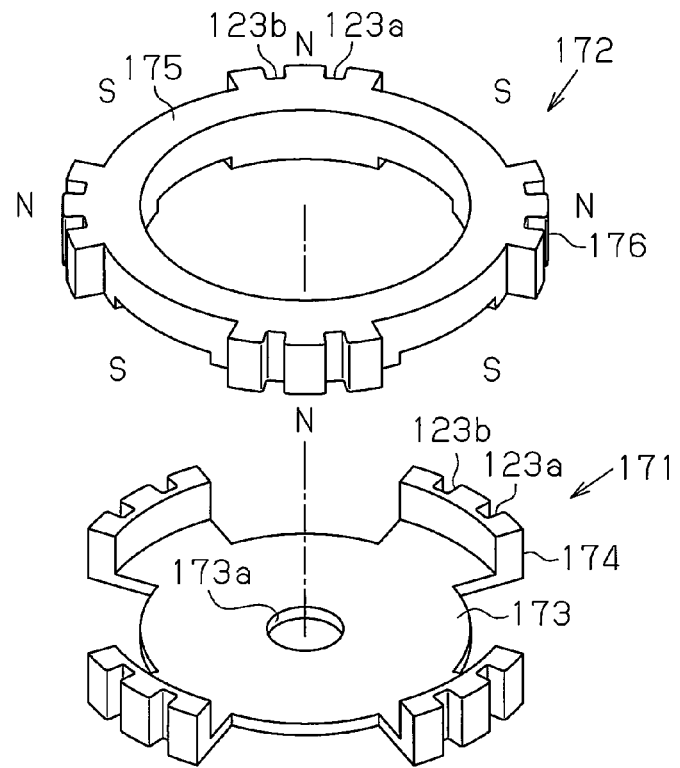
FIG. 28 is an exploded perspective view of the rotor shown in FIG. 27.

The present invention may be applied to a rotor of a type such as that shown in FIGS. 27 and 28.

The rotor shown in FIGS. 27 and 28 includes a thin rotor core 171 and an annular field magnet 172, which is formed by a bonded magnet. The field magnet 172 is coupled to the rotor core 171 in the axial direction.

The rotor core 171 includes a thin disk-shaped core base 173, which has a fastening hole 173a through which the rotation shaft 113 is inserted and fixed, and four claw magnetic poles 174 formed on the outer circumference of the core base 173 at equal intervals in the circumferential direction. The claw magnetic poles 174 project toward the outer side in the radial direction from the core base 173 and extend in the axial direction along the outer circumferential surface of the field magnet 172 (ring 175).

Salient poles 176 are located between the claw magnetic poles 174 in the circumferential direction. The salient poles 176 and the claw magnetic poles 174 are arranged alternately in the circumferential direction at equal intervals (45-degree intervals). Gaps are formed in the circumferential direction between the salient poles 176 and the claw magnetic poles 174. Portions between the salient poles 176 of the ring 175 are in contact with the claw magnetic poles 174 in the radial direction.

The field magnet 172 is a magnet having eight poles, four N poles and four S poles alternately arranged in the circumferential direction. The four N poles each have the same angular width (i.e., 45°). The four S poles each have the same angular width (i.e., 45°). The field magnet 172 is formed so that the salient poles 176 are N poles and the portions of the ring 175 contacting the claw magnetic poles 174 in the radial direction are S poles. The orientation direction of each magnetic pole in the field magnet 172 extends in the radial direction from the rotation shaft 113.

The circumferential surface of each salient pole 176 and each claw magnetic pole 174 is located on a circle of which the center is the axis L of the rotation axis as viewed in the axial direction and forms the outer circumferential surface of the rotor. That is, the salient poles 176 and the claw magnetic poles 174 form the magnetic poles of the rotor. In the same manner as the third embodiment, each outer circumferential surface of the salient pole 176 and the claw magnetic pole 174 includes the first and second auxiliary grooves 123a and 123b.

The rotor of the above structure has the same advantages as the third embodiment. Further, in the present example, a rotor core is not arranged at the inner side of the field magnet 172 (ring 175). The inner side of the field magnet 172 defines a recess of which the core base 173 serves as the bottom. This allows a bearing, which supports the rotation shaft 113, to be arranged in the space at the inner side of the field magnet 172. As a result, the rotor can be shortened in the axial direction.

In the above example, the first and second auxiliary grooves 123a and 123b are formed not only in the circumferential surfaces of the salient poles 176 (field magnet 172) but also in the outer circumferential surfaces of the claw magnetic poles 174. However, the first and second auxiliary grooves 123a and 123b may be omitted from the claw magnetic poles 174.

In the third embodiment, the first and second straight lines L1a and L1b that determine the circumferential middle position of the first and second auxiliary grooves 123a and 123b are set based on the cogging torque cycle (angle φ). However, the first and second auxiliary grooves 123a and 123b may be formed at locations that differ from the third embodiment. In this case, although the detent torque decreases, the detent torque can be adjusted.

In the third embodiment, the first and second auxiliary grooves 123*a* and 123*b* formed in the outer circumferential surface of the field magnet 122 serve as gaps that improve the detent torque. Instead, for example, a hole extending through the field magnet 122 in the axial direction may serve as the gap. That is, the open ends of the first and second auxiliary grooves 123*a* and 123*b* located toward the outer side in the radial direction may be closed. Such a structure obtains the same advantages as the third embodiment.

The number of poles in the rotor 114 of the third embodiment may be changed in accordance with the structure.

In the third embodiment, the present invention is embodied in an inner rotor type motor in which the rotor 114 is arranged at the inner side of the stator 112 in the radial direction. Instead, the present invention may be embodied in an outer rotor type motor in which the rotor is arranged at the outer side of the stator in the radial direction.

The invention claimed is:

1. A rotor comprising:
a field magnet forming at least a portion of an outer circumferential surface of the rotor;
a first core member that includes a plurality of claws arranged in the circumferential direction;
a second core member that includes a plurality of claws arranged in the circumferential direction, wherein the second core member is joined with the first core member; and
a disk magnet located between the first core member and the second core member in an axial direction, wherein the disk magnet is magnetized in the axial direction, wherein
the field magnet is formed by a bonded magnet,
the field magnet includes a gap, and
the field magnet is located at an outer side in a radial direction from the first core member and the second core member.

2. A motor comprising the rotor according to claim 1.

3. A rotor comprising:
a field magnet forming at least a portion of an outer circumferential surface of the rotor, wherein
the field magnet is formed by a bonded magnet and includes a plurality of magnetic poles,
each of the magnetic poles includes two gaps, the two gaps being arranged at a portion of the magnetic pole excepting a boundary between adjacent magnetic poles.

4. The rotor according to claim 3, wherein the gap is a groove formed in the outer circumferential surface of the field magnet and extending in an axial direction.

5. The rotor according to claim 3, wherein the rotor is a full-magnet type rotor in which magnetic poles of the rotor are all formed by the field magnet.

6. The rotor according to claim 3, further comprising:
a rotor core including a core magnetic pole, wherein
the field magnet is a plurality of field magnets arranged in a circumferential direction of the rotor core,
the core magnetic pole is located between the field magnets, and
the field magnets function as first magnetic poles, and the core magnetic pole functions as a second magnetic pole.

7. A motor comprising the rotor according to claim 3.

8. The rotor according to claim 3, wherein the two gaps are arranged at opposite positions respectively separated by an angle $\theta$ from a circumferential center line of each magnetic pole, wherein the angle $\theta$ is obtained from $\theta=(1/2+n)\cdot\phi$, wherein n is an integer, and $\phi$ is a cogging torque cycle.

* * * * *